United States Patent [19]

Ruoff, Jr.

[11] 4,278,920
[45] Jul. 14, 1981

[54] METHOD AND APPARATUS FOR GENERATING POSITION OR PATH CONTROL PROGRAMS USING FORCE FEEDBACK

[75] Inventor: Carl F. Ruoff, Jr., Dayton, Ohio

[73] Assignee: The Bendix Corporation, Southfield, Mich.

[21] Appl. No.: 929,490

[22] Filed: Jul. 31, 1978

Related U.S. Application Data

[63] Continuation of Ser. No. 708,521, Jul. 25, 1976, abandoned.

[51] Int. Cl.³ .................................................. H02K 7/00
[52] U.S. Cl. ............................................. 318/2; 318/568; 318/628; 318/646
[58] Field of Search ................... 318/2, 568, 628, 646; 414/5, 6, 730

[56] References Cited

U.S. PATENT DOCUMENTS

| | | | |
|---|---|---|---|
| 3,648,143 | 3/1972 | Harper et al. | 318/568 |
| 3,986,090 | 10/1976 | Hecker et al. | 318/628 |

FOREIGN PATENT DOCUMENTS

1418710  12/1975  United Kingdom ..................... 318/568

Primary Examiner—S. J. Witkowski
Assistant Examiner—Eugene S. Indyk
Attorney, Agent, or Firm—Kenneth A. Seaman; Howard G. Massung

[57] ABSTRACT

A program controlled workpiece manipulator has a load cell supported between the manipulator clamp and the positioning elements which generate signals proportional to the various components of the forces exerted on the workholder by external instrumentalities. To generate a desired control program for the manipulator the outputs of the load cell and of the position transducers for the manipulator drive servos are used to generate command signals for the drive servos which urge motion of the clamp to reduce the externally imposed forces. The clamp is then manually grasped and urged toward the desired motion and the outputs of the position sensors are recorded during the motion to create a control program which may be replaced to control the manipulator to duplicate the motion.

16 Claims, 5 Drawing Figures

METHOD AND APPARATUS FOR GENERATING POSITION OR PATH CONTROL PROGRAMS USING FORCE FEEDBACK

This is a continuation of application Ser. No. 708,521, filed July 25, 1976, now abandoned.

BACKGROUND OF THE INVENTION

1. Field of the Invention

This invention relates to program control positioning systems and more particularly to methods and apparatus for generating control programs for such positioning systems by manually imposing forces on the positionable member, generating force feedback signals to control the positioning system to move the member to decrease the forces, and recording successive signals generated within the positioning system.

2. Prior Art

Program controlled positioning systems are widely employed with machine tools, transfer machines, work manipulators and the like. These systems may be broadly divided into point-to-point controls, which move a positionable part to a series of discrete positions commanded on a program without exercising any control over the path or rate of part motion between these points, and continuous path systems which exercise control over both the position and rate of motion of the positionable member through an entire programmed path. Control programs for these positioning systems typically consist of a series of numerical commands which define either the series of points that the part is to assume or the nature of short segments of the desired motion along a continuous path.

Preparation of these programs requires knowledge of the positional capability of the machine and a description of the process to be performed. If the machine has a very limited positional capability programs may be quite simply generated; i.e., a cut-off machine may have a stop positionable along a single axis. A program for forming a series of parts of different lengths simply involves the single axis coordinates of the series of positions the stop must assume. As the number of controlled axes increases the programming task becomes more complicated. Some part manipulators may have a large number of degrees of freedom so that they are capable of moving parts in the same versatile way as the human hand. In these systems a particular motion may often be accomplished by a practically infinite number of combinations of motions along the various controlled axes and the programming task is extremely complicated.

In order to avoid the complexities of preparing a control program based on information relating to the machine capability and the operations to be performed, it has been proposed to manually move the positional member through a desired path and to record the resulting outputs of position transducers associated with each of the machine's controlled axes. These transducers need not be specially provided for the purpose of generating control programs since they form part of the closed loop drive systems typically employed with these program controlled machines. U.S. Pat. No. 2,475,245 discloses a control system for a lathe driven by an analog program recorded on magnetic tape. To prepare a program the lathe operator drives the machine using the manual controls to form a sample part and the output signals from synchros in the positioning system and recorded. The recorded program may then be played back to automatically control the lathe to form duplicates of the part. U.S. Pat. No. 3,890,552 discloses a program controlled manipulator having manually controllable means for generating control signals which may either be recorded for later playback or may be used to directly move the manipulator while the outputs of the machine's position transducers are recorded. If the manipulator has a large number of independent degrees of freedom this axis-by-axis type of manual control proves awkward and difficult.

It is accordingly a broad object of the present invention to provide a method and apparatus for generating control programs for a position control system which overcomes these disadvantages of the prior art.

To achieve this object the present invention draws upon another, independent line of technology which involves the use of load cells to measure forces exerted between workpieces held in the grippers of a manipulator and independent parts that the supported workpieces are to be assembled with. These load cell signals are used to modify programmed position commands to achieve desired relationships between the supported workpiece and the independent part. Using this mode of feedback may simplify the programs for various assembly operations. This technique, termed "force feedback steering" is described in a thesis entitled "Force Feedback Steering of a Teleoperator System" by Roland Groome, Jr., submitted to the Massachusetts Institute of Technology on Aug. 14, 1972.

SUMMARY OF THE INVENTION

The present invention is directed toward a method and apparatus for generating a control program for a position system by manually exerting forces on the positional member to direct it along the desired path, employing force feedback to modify the drive control signals to achieve the desired motion and recording the resultant position or motion rate transducer signals. During this process the command signals for the servos which control each axis of freedom of the machine are derived from the force feedback signals and the positional transducers. If rate sensitive servos are employed the feedback signals represent the rates of motion of the controlled axes. If positional servos are employed the feedback signals represent the instantaneous position of the output member. The term "positional condition" as used hereinafter is intended to generically refer to both classes of feedback transducer signals.

The force feedback signals effectively act to modify the existing command signals to cause motion of the controlled axes in such a manner as to decrease the force exerted between the positional member and external instrumentalities, including forces manually exerted on the positional member to guide it along the desired path. In a relatively simple system there may exist a direct, linear relationship between each component of the force and the required change in positional command for each controlled axis. For example, considering the positional member as a stop movable in either direction along a single axis, the system may generate command signals which move the stop at a rate directly proportional to the force manually imposed on the stop. When the stop reaches a desired end point, no further force is exerted and motion of the stop ceases. The operator may then record the output of the position transducer and thus generate one block in the control program. In more complicated systems a one-to-one relationship will not exist between the sensor outputs and the command axes and it will be necessary to perform relatively complex computations to derive the individual axes control signals from the outputs of the load cell. These computations will include translating the outputs of the load cell into components representative of the controlled axes. These computations may be performed with analog circuitry but in more sophisticated equipment they are most economically achieved with a suitably programmed digital computer.

A preferred embodiment of the invention, which will subsequently be disclosed in detail, takes the form of a manipulator having a workpiece gripper connected to an arm formed of a plurality of links. A separate positioning servo controls the motion of the joint between each two links, and the positional transducers for these servos provide a portion of the feedback element for the system.

The outputs of the positional transducer may be continually recorded to develp a continuous path program for later control of the system or, alternatively, the operator may manually select the positions of the manipulator at which it is desired to record the outputs of the position transducers, to generate a point-to-point control program.

This present system not only generates a control program, but retains the manipulator in a rigid configuration by continuously generating control signals to each of the servos; were these signals to be disabled, the manipulator arms would collapse under gravity forces.

The present invention therefore provides a simple and effective method for generating any desired control program for program controlled positioning systems and additionally provides an arrangement for securing the rigid position of an inherently non-rigid manipulator mechanism.

These and other objectives, advantages and applications of the present invention will be illustrated by the following detailed description of several preferred embodiments of the invention.

The description makes reference to the accompanying drawings in which.

Figure 1:
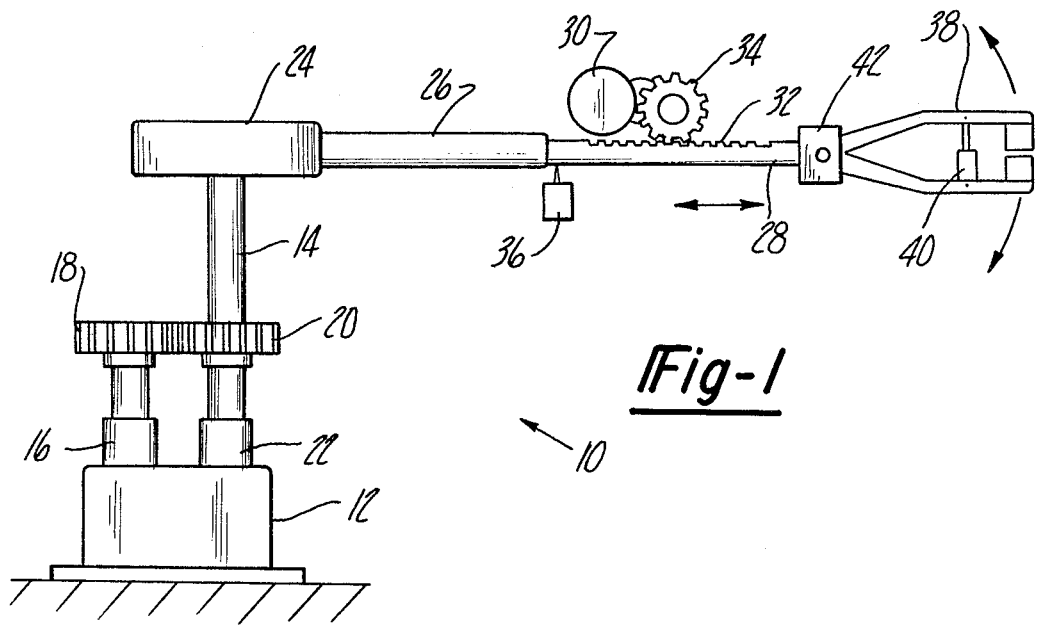
FIG. 1 is a perspective view of a simple form of manipulator equipped for use with the system of the present invention.

Referring to the drawings, the robot or workpiece manipulator, generally indicated at 10 in FIG. 1, is of the type employed to feed workpieces to operating machines such as presses and the like. The manipulator supported on a base 12 includes a vertical shaft 14 rotatably supported for motion about the base. A rotational servo motor 16 is adapted to rotate the shaft 14 through a drive gear 18 connected to the shaft of the servo motor 16, and a driven gear 20 affixed to the vertical shaft 14. A rotational sensor 22 is adapted to provide an electrical output signal which is a function of the positionable condition of the shaft. In the preferred embodiment of the invention this position condition takes the form of a signal proportional to the rate of rotational motion of the vertical shaft 14. In alternative embodiments, the transducer 22 might provide a signal proportional to the instantaneous rotational position of the shaft 14. The choice is primarily dependent upon whether the servo drive constitutes a rate servo or a position servo; although it is possible to use a rate transducer to power a position servo and a position transducer to power a rate servo, generally the required circuitry is more complex.

A hub 24 affixed to the upper end of the vertical shaft 14 supports a horizontally extending arm 26. The arm is preferably tubular in construction and an extension section 28 telescopes within the arm 26. The extension of the section 28 with respect to the arm 26 is controlled by a rotational servo motor 30 that drives the telescoping section 28 by means of a rack 32 which engages a pinion 34 controlled by the servo motor 30. A linear transducer 36 affixed to the end of the arm section 26 senses motion of the telescoping section 28 to provide an output signal proportional to the rate of motion. As previously discussed in connection with the description of the transducer 22, the transducer 36 could alternatively provide an output signal proportional to the extension of the telescoping section 28 rather than its rate of motion.

A workpiece gripper 38 is affixed to the far end of the telescoping section 28. The configuration of the gripper 38 is dependent on the shape of the part to be manipulated and the gripper will be equipped with suitable actuator means such as a pneumatic cylinder 40.

A load cell 42 is connected between the part gripper 38 and the end of the telescoping section 28 so that the load cell experiences forces exerted between the gripper 38 and the arm 28. The load cell may be of the type disclosed in U.S. Pat. No. 3,939,704, assigned to the assignee of the present invention, or of the type disclosed in U.S. patent application Ser. No. 615,852, also assigned to the assignee of the present invention. Another suitable form of load cell is described in a published master's thesis entitled "Force Feedback Steering of a Teleoperator System" by Roland Groome, Jr., M.I.T. Draper Laboratory Report T-575, August, 1972. The load cell described in that thesis employs four square cross-section cantilever bars arranged in a cross pattern. Resistive strain gages are supported on each of the four faces of each bar to measure the forces experienced by each of the bars.

As described in the report, the strain gages on the opposite faces of each bar are wired together in a bridge circuit to form eight pairs of force sensing elements.

Figure 2:
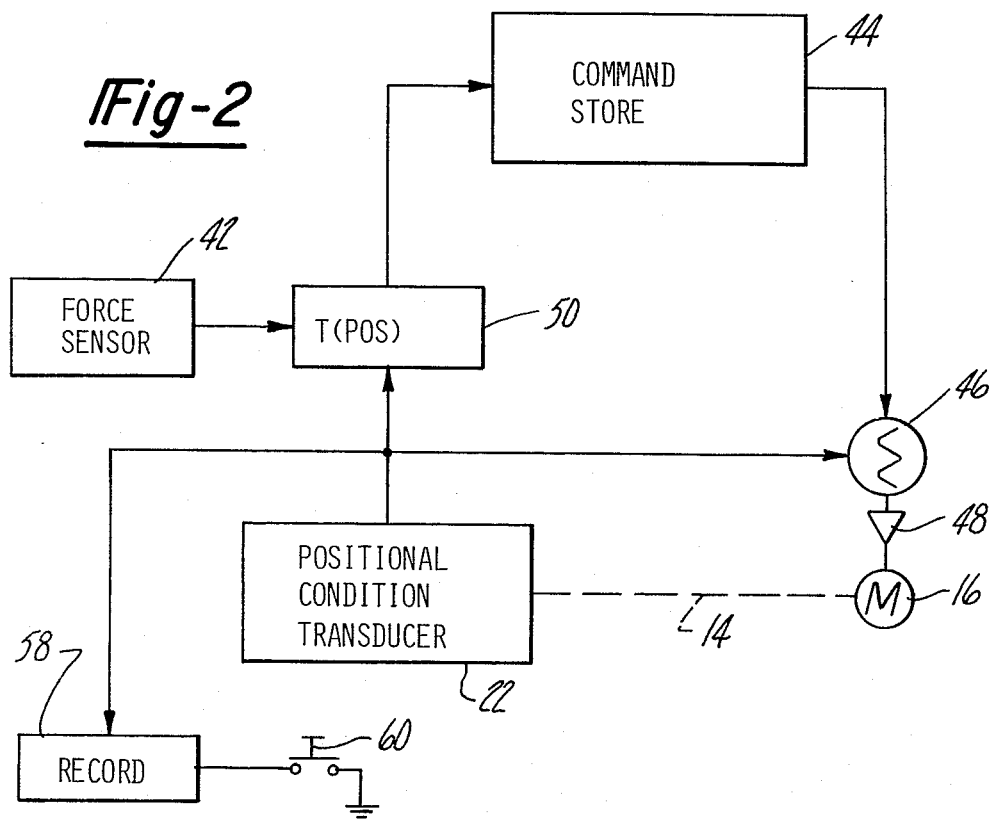
FIG. 2 is a block diagram showing a portion of the control system used with the manipulator of FIG. 1, illustrating the servo for controlling one of the two controlled axes of the manipulator.
Figure 3A:
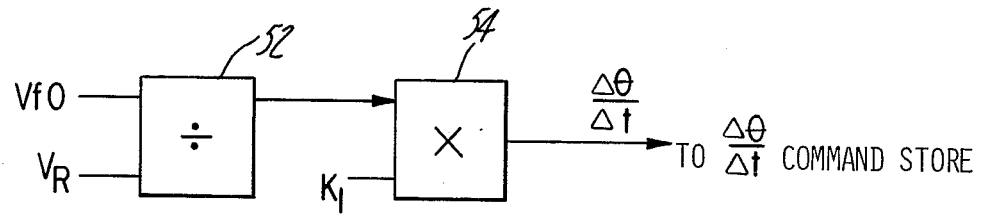
FIG. 3 is a more detailed block diagram of the subsystem illustrated in FIG. 2, which receives the outputs of the force transducer and the positional conditional transducers generates signals which command changes in the servo command stores.
Figure 3B:
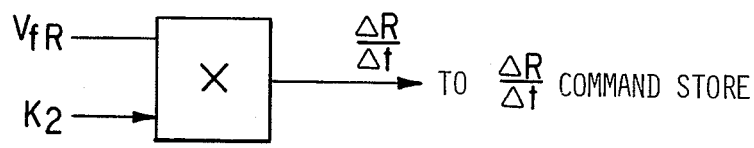

Whatever specific load cell configuration is employed, in the embodiment of FIGS. 1–3, it is connected so as to provide one output proportional to the forces imposed on the gripper 38 along the axis of arm 26, and a second output proportional to the forces imposed on the gripper normally to that axis and to the axis of shaft 14.

The manipulator of FIG. 1 may thus move the gripper by rotating the shaft 14 (the $\theta$ axis) and by extending and retracting the telescoping section 28 relative to the arm 26 (the R axis).

The broad configuration of the control system for the manipulator of FIG. 1 is disclosed in FIG. 2. FIG. 2 discloses the controls for the $\theta$ axis and the controls for the R axis are identical, except as noted below.

The command signals which drive the motor 16 to rotate the shaft 14 and thus control the position of the manipulator in the θ axis are derived from a command store unit 44. These commands may be either digital or analog in nature. If they are digital, the command store may take the form of a plurality of bistable devices. If the signals are analog, the command store could take the form of a magnetic tape.

This command signal is applied to a comparator 46, along with the output of the transducer 22 which indicates the actual rate of rotation of the shaft 14. Comparator 46 derives an error signal proportional to the difference between these two inputs and applies it to a driver amplifier 48 which energizes the motor 16.

The output of the transducer 22 is also applied to transformation block 50. That block also receives the output of the force sensor 22 representing the force imposed between the gripper 38 and the arm 28, along the θ axis. That block 50 generates a signal which causes the output of the command store 44 to be modified so as to cause a motion of the motor 16 which will decrease the measured force; i.e., rotate the shaft 14 in the direction urged by the force at a rate proportional to the force.

The transformation unit 50 is the only block that substantially differs for the R axis and the θ axis. FIG. 3A illustrates the construction of the block 50 for the θ axis. Two voltages, $V_{f\theta}$, which is the signal from the force sensor 42 representing the force exerted along the θ axis, and $V_r$, which is the positional transducer 36 output representing the extension of the telescoping section 28 from the arm 26, are applied to divider 52. The divider divides the force signal by the radius signal, since the rate of rotational motion of the shaft 14 will effectively be multiplied by the radius of the arm in effecting movements of the gripper 38. Accordingly the divider 52 divides $V_{f\theta}$ by $V_r$ and applies the output to a multiplier 54 which multiplies the quotient by a proportionality constant $K_1$. The resulting output signal is proportional to $\Delta\theta/\Delta t$, i.e., the required change in the rate of rotation of the shaft 14 and this is provided to the command store 44.

In the case of the R axis the signal $V_{fr}$, the output of the sensor 42 representative of the component of force along the axis of the arm 26 is multiplied by a constant $K_2$ in a unit 56. The output is used to modify the command store.

This control system will move the gripper 38 in the direction of a force imposed upon the gripper, and at a rate proportional to the force. Consider both the command stores for both the R and θ axes to be initially zero. If the gripper is manually grasped and urged toward motion in a particular direction, the unit 50 will generate command increments for the R and the θ command stores which will cause them to generate command signals which move the gripper in such a direction as to minimize the force. When the gripper reaches a desired position, manually maintaining it in that position will cause the generation of increments in the command signals which bring the gripper to rest, so that the hand may be removed and the gripper will be maintained in that position by the servo command.

To generate a program for a desired motion, the gripper is manually urged along the desired path, at a desired rate. The outputs from the positional transducers 22 and 36 are recorded in a unit 58. This record constitutes a program which may be later played back and provided to the comparator 46 to cause the gripper to move through the desired path at the desired rate. If a point-to-point program is to be provided, the positions of the gripper which are to be recorded may be manually signaled to the system by depressing the switch 60 when the gripper is in each desired position.

The transformation unit 50 and the command store 44 of machine of FIGS. 1-3 are sufficiently simple to be economically realizable with hard wired circuitry of either analog or digital design; but the transformation unit 50 and the command store 44 may also be achieved by a suitable programmed digital processor. In more complex embodiments of the invention the use of such processors may be economically advantageous. Broadly, the processor would receive the outputs of the force sensors and the positional condition transducers and would generate error signals for driving the output motors. The processors would thus embody the transformation unit 50, the command store 44 and the comparator 46. The processor might also perform analog to digital or digital to analog conversions.

The factor present in the embodiment of FIGS. 1-3 which renders the control system extremely simple is primarily that the outputs of the load cell directly represent the forces imposed on the machine's controlled axes. In more complex systems this may not be the case and it may be necessary to perform a series of relatively complex numerical operations on the outputs of the load cell and the positional conditional transducer to generate the required increments in command signal for the various axes.

For example, the sensor outputs may not have a one-to-one relationship to the control axes because they may be in a different spatial frame and also, the machine may have a positional redundancy so that a particular force exerted on the sensor may be decreased by motions imposed on more than one of the machine's controlled axes.

Figure 4:
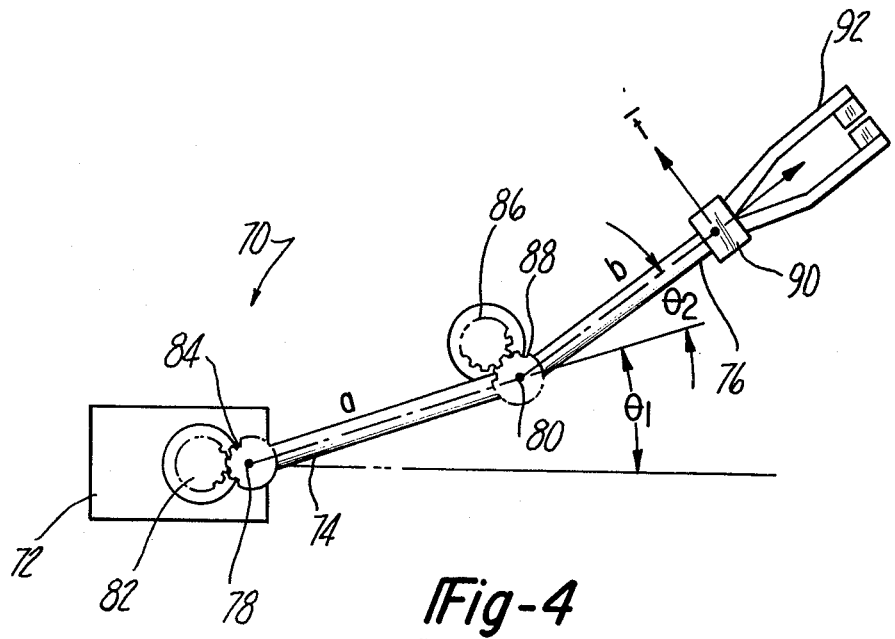
FIG. 4 is a schematic diagram of a second manipulator representing another embodiment of the invention.

FIG. 4 illustrates another manipulator, generally indicated at 70, representing a second embodiment of the invention. The manipulator 70 has a base 74 supporting two elongated arms 74 and 76. One end of the arm 76 is supported at a horizontal pivot point 78, affixed to the base 72 and the other end of the arm 74 is pivotably joined to one end of the second arm 76 by a joint 80. The two joints provide rotation of the arms about parallel axes. A drive motor 82 affixed to the base controls the position of arm 74 through gearing 84 and a second servo motor 86 affixed to the far end of the arm 74 controls rotation of the arm 76 about the joint 80 through gearing 88. The far end of arm 76 carries a multi-axis load cell 90 and a workpiece gripper 92 is supported on the end of the arm 76, on the far side of the load cell 90. The motors 82 and 86 thus control the position of the gripper 92 in a vertical plane perpendicular to axes 78 and 80.

The control system for the manipulator of FIG. 4 is substantially identical to the system illustrated in FIG. 2 but the transformation unit 50 must perform a more complex operation.

Consider the length of arm 74 from joint 78 to joint 80 to be A; the length of arm 76 from joint 80 to joint 90 to be B; the angle of arm 74 with respect to the horizontal axis to be $\theta_1$; the angle of arm 76 relative to 74 to be $\theta_2$; and the forces sensed by the load cell 90 to have a longitudinal component $\overline{L}$ and a transverse component $\overline{T}$.

When $\theta_1 = \theta_2 = 0$ the axes of the load cell 90 $\overline{T}$ and $\overline{L}$, are parallel to the vertical and horizontal axes respectively (that is the axis of support of the base 72 and the axis transverse to it in the vertical plane).

The transformation unit 72 must generate signals to drive the manipulator along the $\theta_1$ and $\theta_2$ axes in such a way that the original load cell 90 moves in the direction of a force applied to the load cell.

From FIG. 4 it may be seen that the sensor origin is located at $$x = a\cos\theta_1 + b\cos(\theta_1 + \theta_2)$$

$$y = a\sin\theta_1 + b\sin(\theta_1 + \theta_2)$$

So that, for small displacements, where $\phi = \theta_1 + \theta_2$ $$\Delta x = -a\sin\theta_1 \Delta\theta_1 - b\sin\phi\Delta\phi$$

$$\Delta y = a\cos\theta_1 \Delta\theta_1 + b\cos\phi\Delta\phi$$

or $$\begin{pmatrix} \Delta x \\ \Delta y \end{pmatrix} = \begin{pmatrix} -\sin\theta_1 & -\sin\theta \\ \cos\theta_1 & \cos\theta \end{pmatrix} \begin{pmatrix} a\Delta\theta_1 \\ b\Delta\theta \end{pmatrix}$$

which can be inverted to obtain $$\begin{pmatrix} a\Delta\theta_1 \\ b\Delta\phi \end{pmatrix} = \frac{1}{\sin\theta_2} \begin{pmatrix} \cos\theta & \sin\theta \\ -\cos\theta_1 & -\sin\theta_1 \end{pmatrix} \begin{pmatrix} \Delta x \\ \Delta y \end{pmatrix}$$

We wish $\Delta x/\Delta t$ and $\Delta y/\Delta t$ to be proportional to the forces fx and fy. The forces are measured in the sensor frame, however, so they must be transformed:

$$\begin{pmatrix} fx \\ fy \end{pmatrix} = \begin{pmatrix} \cos\phi & -\sin\phi \\ \sin\phi & \cos\phi \end{pmatrix} \begin{pmatrix} fL \\ ft \end{pmatrix}$$

Where fL and ft are force components along the sensor $\bar{l}$ and $\bar{t}$ axes respectively as measured by the sensor. Since for rate servos we want the velocity to be proportional to the force $$\begin{pmatrix} vx \\ vy \end{pmatrix} = \begin{pmatrix} \Delta x/\Delta t \\ \Delta y/\Delta t \end{pmatrix} = k\begin{pmatrix} fx \\ fy \end{pmatrix} = k\begin{pmatrix} \cos\phi & -\sin\phi \\ \sin\phi & \cos\phi \end{pmatrix} \begin{pmatrix} fL \\ ft \end{pmatrix}$$

to get the $\theta_1$ and $\phi$ velocities we use the above results to get:

$$\begin{pmatrix} \frac{\Delta\theta_1}{\Delta t} \\ \frac{\Delta\phi}{\Delta t} \end{pmatrix} =$$

$$\frac{k}{\sin\theta_2}\begin{pmatrix} 1/a & 0 \\ 0 & 1/b \end{pmatrix} \begin{pmatrix} \cos\phi & \sin\phi \\ -\cos\theta_1 & -\sin\theta_1 \end{pmatrix} \begin{pmatrix} \cos\phi & -\sin\phi \\ \sin\phi & \cos\phi \end{pmatrix} \begin{pmatrix} fL \\ ft \end{pmatrix}$$

Now note that $(\Delta\phi/\Delta t) - (\Delta\theta_1/\Delta t) = \Delta\theta_2/\Delta t$
Therefore $$\begin{pmatrix} \frac{\Delta\theta_1}{\Delta t} \\ \frac{\Delta\theta_2}{\Delta t} \end{pmatrix} = T(\theta_1, \theta_2)\begin{pmatrix} fL \\ ft \end{pmatrix} \text{ with}$$

$$T(\theta_1, \theta_2) =$$

$$\frac{k}{\sin\theta_2}\begin{pmatrix} 1 & 0 \\ -1 & 1 \end{pmatrix}\begin{pmatrix} \frac{1}{a} & 0 \\ 0 & \frac{1}{b} \end{pmatrix}\begin{pmatrix} \cos\phi & \sin\phi \\ -\cos\theta_1 & -\sin\theta_1 \end{pmatrix}\begin{pmatrix} \cos\phi & -\sin\phi \\ \sin\phi & \cos\phi \end{pmatrix}$$

$T(\theta_1, \theta_2)$ is the calculation that must be performed by the transformation unit 50. The outputs of that transformation provides the output velocities $\Delta\theta_1/\Delta t$ and $\Delta\theta_2/\Delta t$. If position servos are employed rather than rate servos, these quantities may be multiplied by $\Delta t$ to obtain $\Delta\theta_1$ and $\Delta\theta_2$.

Like the manipulator of the embodiment of FIGS. 1-3, the gripper 92 of the manipulator 70 may be grasped, and may be moved along a path, or to a series of points that are to constitute the path or points of a desired program for the device. The control system succumbs to the imposed forces on the load cell 90 and moves the manipulator arms to the desired position. The path or the points which are generated by the positional transducers during this excursion are recorded to provide the program for later playback to the system.

The embodiments of the invention in which an exclusive property or privilege is claimed are defined as follows:

1. Apparatus for generating a control program for a machine having a positionable member and a drive system for the member operable under control of the program, comprising: a first sensor for generating signals which are a function of forces imposed on the member by an interaction between the member and an external instrumentality; a second sensor for generating signals which are functions of the position of the member; means for receiving the signals from the first sensor and the second sensor and for generating a command signal which is a function of the desired position of the member to decrease the forces exerted between the member and the external instrumentality; comparator means for receiving the command signal and the output of the second sensor and for generating an error signal which is a function of this input and is applied to the drive system to effect movement of the member; and means for recording at least certain of said signals representative of the position of the member.

2. The apparatus of claim 1 wherein said means for receiving the signals from the first sensor and the second sensor and for generating a command signal which is a function of the desired position of the member includes means for storing a previously generated command signal, and means for modifying that command signal as a function of the signal from the first sensor and the second sensor.

3. The apparatus of claim 1 in which the drive system for the positionable member comprises a continuous path control and in which said means for recording at least said certain of said signals representative of the position of the member comprises means for continuously recording the outputs of the second sensor.

4. The apparatus of claim 1 in which said drive system for the member comprises a point-to-point positioning system and wherein the means for recording at least certain of said signals representative of the position of the member are manually controlled to record such signal at discrete positions of the member.

5. The apparatus of claim 1 wherein the machine constitutes a manipulator and the positionable member a workpiece gripper, and in which the sensor for generating signals which are a function of forces imposed on the member by interaction between the member and an external instrumentality constitutes a multi-axis load cell supported between the gripper and its supporting structure.

6. The apparatus of claim 5 wherein the manipulator includes a fixed base and a train of serially connected arms with one end of the train connected to the base and the other end connected to the gripper, and the second sensor comprises a plurality of transducers connected at each link in the chain to generate signals proportional to the instantaneous position of each set of two connecting elements in the chain relative to one another.

7. The apparatus of claim 6 wherein said means for receiving the signals from the force sensor and the second sensor and for generating a command signal which is function of the desired position of the member includes means for transforming a plurality of outputs of the multi-axis load cell to a plurality commands for the drive system.

8. The apparatus of claim 1 wherein said means for receiving the signals from the force sensor and the second sensor and for generating a command signal which is a function of the desired position of the member comprises a program controlled digital computer.

9. The method of generating a control program for a machine having a positionable member, a drive system for moving said positionable member under control of the program, a force sensor operative to generate signals which are functions of the forces exerted between the positionable member and an external instrumentality, and position sensors for generating signals which are a function of the position of the positionable member, comprising: manually imposing forces on the positionable member to urge it toward motion in a desired manner; generating control signals for the drive system which are functions of the outputs of said force sensor and the position sensors, which control motion of the positionable member to decrease the manually imposed forces; and recording the outputs of the position sensors.

10. The method of claim 9 wherein the step of generating control signals for the drive system which are functions of the outputs of the force sensor and the position sensors, which control the motion of the positional member to decrease the manually imposed forces, includes generating signals representative of commanded positional condition of the member, comparing the commanded position signals with the outputs of the sensors for generating signals which are a function of the position of the positional member, and applying control signals to the drive system which have values that are functions of the differences between the commanded position and the actual position.

11. The method of claim 10 including the step of storing previous commanded position signals and modifying the previous commanded position signals as a function of the output of the force sensor and the position sensor.

12. The method of claim 9 wherein said machine constitutes a manipulator having a chain of arms, with one end of the chain affixed to the base, the positionable member constitutes a gripper supported at the other end of the arm chain, the force sensor constitutes a load cell supported between the gripper and the end of the chain which supports the gripper, and in which the step of generating control signals for the drive system which are functions of the outputs of the force sensors and the position sensors includes the step of transforming the outputs of the force sensors into a plurality of signals representative of the desired motions of at least some of the various arms of the chain.

13. The method of claim 9 in which said drive system constitutes a point-to-point numerical control system and including the step of manually controlling the generation of signals which cause the outputs of the position sensors to be recorded each time the positionable member reaches a controlled point along its position path.

14. The method of generating a control program for a manipulator having a base, a work gripper, a train of serially connected arms having one end of the train connected to the base and the other end to the gripper, drive means for controlling the positions of the arm to control the ultimate position of the gripper, a force sensor operative to generate signals proportional to forces exerted between the gripper and an external instrumentality, and sensors for generating signals which are a function of the instantaneous position of the gripper, comprising: manually grasping the gripper and urging it toward motion along a desired path; generating control signals for the drive system which are functions of the outputs of the force sensor and the instantaneous position sensors which control motion of the positional member to decrease the manually imposed forces; and recording the outputs of the position sensors.

15. Apparatus for generating a control program for a machine having a positionable member and a drive system including a position servo for the member operable under control of the program, comprising: a sensor for generating signals which are a function of forces imposed on the member by interaction between the member and an external instrumentality; a position sensor for generating signals which are functions of the positionable condition of the member; means for receiving the signal from the force sensor and the positional condition sensor and for generating a command signal which is a function of the desired positional condition of the member to decrease the forces exerted between the member and the external instrumentality; comparator means for receiving the command signal and the output of the positional condition sensor and for generating an error signal which is a function of this input and is applied to the drive system to effect movement of the member; and means for recording at least certain of said signals representative of the positional condition of the member.

16. The method of generating a control program for a machine having a positionable member, a drive system including a position servo for moving said positionable member, under control of the program, a force sensor operative to generate signals which are functions of the forces exerted between the positionable member and an external instrumentality, and sensors including position transducers for generating signals which are a function of the positional condition of the positionable member, comprising: manually imposing forces on the positionable member to urge it toward motion in a desired manner; generating control signals for the drive system which are functions of the outputs of said force sensor and the positional conditional sensors, which control motion of the positional member to decrease the manually imposed forces; and recording the output of the positional condition sensors.

* * * * *